US009534519B2

(12) United States Patent
Valkenberg

(10) Patent No.: US 9,534,519 B2
(45) Date of Patent: Jan. 3, 2017

(54) VARIABLE DISPLACEMENT VANE PUMP WITH INTEGRATED FAIL SAFE FUNCTION

(71) Applicant: Stackpole International Engineered Products, Ltd., Mississauga, Ontario (CA)

(72) Inventor: Ralph Valkenberg, Stolberg (DE)

(73) Assignee: STACKPOLE INTERNATIONAL ENGINEERED PRODUCTS, LTD., Mississauga, Ontario (CA)

( * ) Notice: Subject to any disclaimer, the term of this patent is extended or adjusted under 35 U.S.C. 154(b) by 225 days.

(21) Appl. No.: 14/588,049

(22) Filed: Dec. 31, 2014

(65) Prior Publication Data

US 2016/0186623 A1 Jun. 30, 2016

(51) Int. Cl.
  *F01C 20/18* (2006.01)
  *F01M 1/16* (2006.01)
  *F01M 1/02* (2006.01)
  *F04C 2/344* (2006.01)
  *F04C 14/22* (2006.01)

(52) U.S. Cl.
  CPC ............... *F01M 1/16* (2013.01); *F01M 1/02* (2013.01); *F04C 2/344* (2013.01); *F04C 14/226* (2013.01); *F01M 2001/0238* (2013.01); *F01M 2001/0246* (2013.01)

(58) Field of Classification Search
  CPC .... F01M 1/02; F01M 1/16; F01M 2001/0238; F01M 2001/0246; F04C 14/226; F04C 2/344
  See application file for complete search history.

(56) References Cited

U.S. PATENT DOCUMENTS 4,510,962 A * 4/1985 Mott .................... F04C 14/226
                                                                        137/102
6,120,256 A   9/2000 Miyazawa
(Continued)

FOREIGN PATENT DOCUMENTS

EP   1 350 957        10/2003
JP   4070391 B2      4/2008

OTHER PUBLICATIONS

U.S. Appl. No. 14/477,620, filed Sep. 4, 2014, Manfred Arnold.
International Search Report and Written Opinion dated Mar. 30, 2016 for Appln. No. PCT/IB2015/060076.

*Primary Examiner* — Jesse Bogue
(74) *Attorney, Agent, or Firm* — Pillsbury Winthrop Shaw Pittman, LLP

(57) ABSTRACT

A variable displacement vane pump has a pressure controlled valve moveable between first and at least second valve positions based on an output pressure of the pressurized lubricant delivered through the outlet. The pressure controlled valve provides an integrated fail safe function to the pump when an electrical valve fails. The pressure controlled valve is inactive in the first position for an output pressure below a threshold level, allowing an electrical valve (pulse width modulation (PWM) valve) to selectively control pressure in the control chamber under normal operation of the pump. In fail safe regulation mode, the electrical valve function is disabled and the pressure controlled valve is active in its second position, controlling pressure in the control chamber. Channels and vents in the pump can be opened and closed based on selective movement of the valve when the outlet pressure is at or above a threshold level.

11 Claims, 7 Drawing Sheets

(56) References Cited

U.S. PATENT DOCUMENTS

| | | | |
|---|---|---|---|
| 6,155,797 | A | 12/2000 | Kazuyoshi |
| 6,481,458 | B2 | 11/2002 | Hirano et al. |
| 8,047,822 | B2 | 11/2011 | Shulver et al. |
| 8,057,201 | B2 | 11/2011 | Shulver et al. |
| 8,444,395 | B2 | 5/2013 | Tanasuca et al. |
| 8,720,849 | B2 | 5/2014 | Williamson |
| 2005/0019175 | A1 | 1/2005 | Uchino et al. |
| 2008/0069704 | A1* | 3/2008 | Armenio ............... F04C 14/223 417/310 |
| 2012/0183426 | A1* | 7/2012 | Maffeis ................ F04C 2/3442 418/181 |
| 2013/0039790 | A1* | 2/2013 | Cuneo .................. F04C 2/3442 418/17 |
| 2013/0136641 | A1 | 5/2013 | Novi et al. |
| 2014/0072456 | A1 | 3/2014 | Watanabe et al. |
| 2014/0072458 | A1 | 3/2014 | Watanabe |
| 2016/0069346 | A1* | 3/2016 | Arnold .................... F01M 1/16 418/22 |
| 2016/0186752 | A1* | 6/2016 | Valkenberg ........... F04C 2/3441 418/28 |

\* cited by examiner

VARIABLE DISPLACEMENT VANE PUMP WITH INTEGRATED FAIL SAFE FUNCTION

BACKGROUND

Field

The present disclosure is generally related to a variable displacement vane pump for providing pressurized lubricant to a system. More specifically, this disclosure relates to integrating a fail-safe function into a pump using a pressure controlled pilot valve.

Description of Related Art

Vane pumps are known for use for pumping fluids or lubricants, such as oil, to internal combustion engines. Some known systems may utilize a single control chamber for moving lubricant. U.S. Patent Application Nos. 2008/0069704, 2012/0183426, and 2013/0136641 illustrate examples of passively controlled variable vane pump having one control chamber, each of which is hereby incorporated in their entirety. Other types of pumps are disclosed in U.S. Pat. Nos. 8,047,822, 8,057,201, and 8,444,395, which are also incorporated herein in their entirety.

SUMMARY

It is an aspect of this disclosure to provide a variable displacement vane pump for dispensing lubricant to a system. The pump is connected to a lubricant sump for holding lubricant. The pump includes: a housing, an inlet for inputting lubricant from a source into the housing, and an outlet for delivering pressurized lubricant to the system from the housing. The pump also includes a control slide displaceable within the housing between a first slide position and a second slide position to adjust displacement of the pump through the outlet, a resilient structure biasing the control slide towards the first slide position, a rotor with at least one vane mounted in the housing and configured for rotation within and relative to the control slide, the at least one vane configured for engagement with an inside surface of the control slide during rotation thereof, and a control chamber between the housing and the control slide for receiving pressurized lubricant to move the control slide towards the second position. The pump also has an electrical valve fluidly connected to the control chamber to control pressure therein. A first channel connects the control chamber and the electrical valve. Further, the pump has a pressure controlled valve moveable between a first valve position and a second valve position based on an output pressure of the pressurized lubricant delivered through the outlet. The pressure controlled valve is in the first valve position for the output pressure below a threshold level and in the second valve position for the outlet pressure that is at or above the threshold level. A second channel connects the pressure controlled valve and the control chamber, and a third channel vents the electrical valve. A fourth channel is connected to the third channel and the pressure controlled valve and configured for selective communication with the lubricant sump. A fifth channel connects the pressure controlled valve and the outlet. In its first valve position, the pressure controlled pilot valve is inactive and (a) closes fluid communication through the second channel to the control chamber, and (b) opens the fourth channel for communication to the lubricant sump thereby allowing the electrical valve to pressurize the control chamber by delivering fluid in through the first channel and vent the control chamber via the third and fourth channels. In its second valve position, the pressure controlled pilot valve is active and (a) controls pressure in the control chamber via fluid communication from the outlet, through the fifth channel and through the second channel to the control chamber, and (b) closes fluid communication through the fourth channel to the lubricant sump, thereby pressurizing the control chamber via flow from the outlet to the control chamber. The pressure controlled valve is configured for selective movement to the second valve position via fluid communication through the fifth channel when the outlet pressure is at or above the threshold level and the electrical valve is disabled.

Another aspect provides a system that includes: an engine; a lubricant source containing lubricant and a variable displacement vane pump connected to the lubricant source for dispensing lubricant to the engine. The pump is connected to a lubricant sump for holding lubricant. The pump includes: a housing, an inlet for inputting lubricant from a source into the housing, and an outlet for delivering pressurized lubricant to the system from the housing. The pump also includes a control slide displaceable within the housing between a first slide position and a second slide position to adjust displacement of the pump through the outlet, a resilient structure biasing the control slide towards the first slide position, a rotor with at least one vane mounted in the housing and configured for rotation within and relative to the control slide, the at least one vane configured for engagement with an inside surface of the control slide during rotation thereof, and a control chamber between the housing and the control slide for receiving pressurized lubricant to move the control slide towards the second position. The pump also has an electrical valve fluidly connected to the control chamber to control pressure therein. A first channel connects the control chamber and the electrical valve. Further, the pump has a pressure controlled valve moveable between a first valve position and a second valve position based on an output pressure of the pressurized lubricant delivered through the outlet. The pressure controlled valve is in the first valve position for the output pressure below a threshold level and in the second valve position for the outlet pressure that is at or above the threshold level. A second channel connects the pressure controlled valve and the control chamber, and a third channel vents the electrical valve. A fourth channel is connected to the third channel and the pressure controlled valve and configured for selective communication with the lubricant sump. A fifth channel connects the pressure controlled valve and the outlet. In its first valve position, the pressure controlled pilot valve is inactive and (a) closes fluid communication through the second channel to the control chamber, and (b) opens the fourth channel for communication to the lubricant sump thereby allowing the electrical valve to pressurize the control chamber by delivering fluid in through the first channel and vent the control chamber via the third and fourth channels. In its second valve position, the pressure controlled pilot valve is active and (a) controls pressure in the control chamber via fluid communication from the outlet, through the fifth channel and through the second channel to the control chamber, and (b) closes fluid communication through the fourth channel to the lubricant sump, thereby pressurizing the control chamber via flow from the outlet to the control chamber. The pressure controlled valve is configured for selective movement to the second valve position via fluid communication through the fifth channel when the outlet pressure is at or above the threshold level and the electrical valve is disabled.

Other aspects and advantages of the present invention will become apparent from the following detailed description, the accompanying drawings, and the appended claims.

DETAILED DESCRIPTION OF THE PREFERRED EMBODIMENT(S)

As detailed herein, a variable displacement vane pump has pressure controlled pilot valve moveable between a first valve position and at least a second valve position based on an output pressure of the pressurized lubricant delivered through the outlet. The pressure controlled pilot valve provides an integrated fail safe function to the pump. The pressure controlled pilot valve is inactive in the first valve position for an output pressure below a threshold level and is disabled, allowing a pulse width modulation (PWM) valve to control pressure in the control chamber of the pump. In fail safe regulation mode, the PWM function is disabled and the pilot valve takes over and moves towards or into its second valve position to control pressure in the control chamber. Channels and vents in the pump can be opened and closed based on the selective movement of the pilot valve when the outlet pressure is at or above a threshold level.

As understood by one of ordinary skill in the art, "pump displacement" or "displacement" as used throughout this disclosure refers to a volume of liquid (lubricant) a pump is capable of moving during a specified period of time, i.e., a flow rate.

Figure 2:
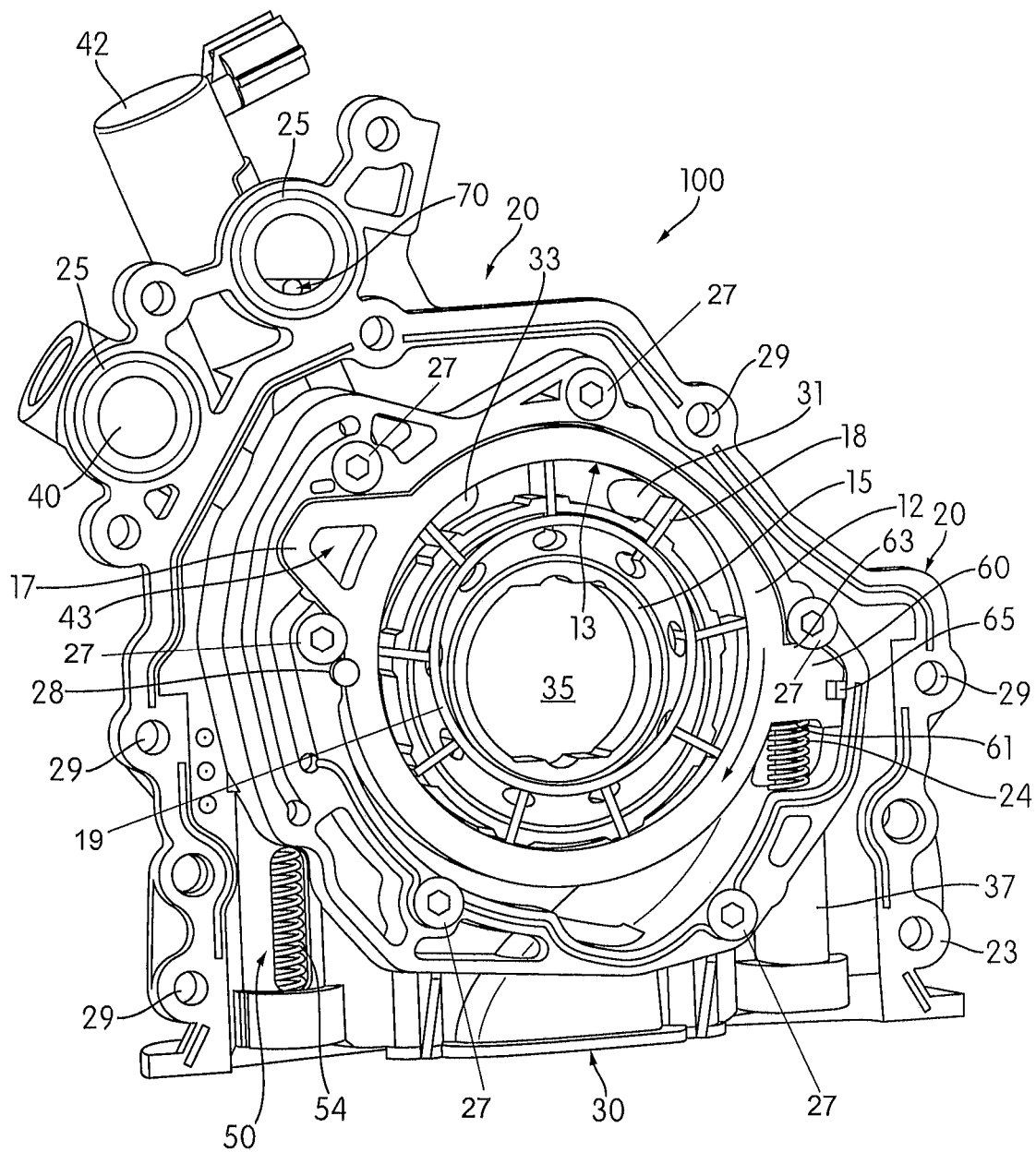
FIG. 2 is an underside perspective view of a pump housing having a control chamber, a PWM valve, channels, and a pressure controlled pilot valve in accordance with an embodiment of this disclosure.

FIG. 2 is a perspective view of a pump 100 in accordance with an embodiment of the present disclosure. The pump 100 is a variable displacement vane pump for dispensing lubricant to a system in accordance with an embodiment. Pump 100 has a housing 20 with an inlet 30 and an outlet 40. The inlet 30 receives fluid or inputs lubricant to be pumped (typically oil in the automotive context) from a source 26 (see FIG. 12) into the housing 20, and the outlet 40 is used for discharging or delivering the pressurized fluid or lubricant to the system, e.g., engine, from the housing 20; and a lubricant sump (not shown) for holding lubricant. A control slide 12 (explained in greater detail below), a rotor 15, a drive shaft (not shown), and resilient structure 24 are provided in housing 20, as is generally known in the art. The pump shown in FIG. 2 has a single control chamber between the housing 20 and the control slide 12 for receiving pressurized lubricant to move the control slide 12. The inlet and outlet 30, 40 are disposed on opposing radial sides of the rotational axis of the rotor 15. As shown in FIG. 2, for example, the housing 20 has at least one inlet port 31 for intaking fluid to be pumped, and at least one outlet port 33 for discharging the fluid. The inlet port 31 and outlet port 33 each may have a crescent shape, and may be formed through the same wall located on one axial side or both axial sides of the housing (with regard to the rotational axis of the rotor 15). The inlet and outlet ports 31, 33 are disposed on opposing radial sides of the rotational axis of the rotor 15. These structures are conventional, and need not be described in detail. The shape of the inlet 30 and/or outlet 40 is not intended to be limiting. Other configurations may be used, such as differently shaped or numbered ports, etc. Further, it should be understood that more than one inlet or outlet may be provided (e.g., via multiple ports).

The housing 20 may be made of any material, and may be formed by aluminum die cast, powdered metal forming, forging, or any other desired manufacturing technique. The housing 20 encloses an internal control chamber (a single chamber). In the drawings, the main shell of the housing 20 is shown. Walls define axial sides of the internal chamber and a peripheral wall 23 extends around to surround the internal chamber peripherally. A cover (e.g., partially shown in FIG. 3) attaches to the housing 20, such as by fasteners 27 (e.g., see FIG. 2 for a top view of fasteners) (e.g., bolts) that are inserted into various fastener bores placed along or around the housing 20 (e.g., around and outside the rotor receiving space 35). The cover is not shown in FIG. 2, for example, so that some of the internal components of the pump can be seen. However, use of such cover is generally well known and need not be described in greater detail herethroughout. The cover may be made of any material, and may be formed by aluminum die cast, powdered metal forming, forging, or any other desired manufacturing technique. The drawings also show parts of and an underside of the cover, which helps enclose the internal control chamber of the pump 100 along with the housing 20. A gasket or other seal(s) may optionally be provided between the cover and peripheral wall 23 of the housing 20 to seal the internal chamber. Additional fastener bores (also shown in FIG. 2, without fasteners therein) for receipt of fasteners may be provided along the peripheral wall of the pump 10, to secure or fix the pump 10 to an engine, for example.

The housing 20 and cover includes various surfaces for accommodating movement and sealing engagement of the control slide 12, which will be described in further detail below.

The control slide 12 is displaceable within the housing 20 and relative to the cover between a first slide position and a second slide position (or in between the two positions) to adjust displacement of the pump 100 through the outlet 40 (e.g., as fed through the outlet port). The housing 20 may include a slide stop 63 and seal 65 for the control slide 12, for example. In accordance with an embodiment, the control slide 12 is pivotally mounted and configured for pivotal displacement within the housing 20 between the first and second slide positions. The first slide position is defined as a home position for maximum displacement. The second slide position is defined as a position away from the first slide position or position for maximum displacement, e.g., a reduced displacement position. More specifically, it can include any number of positions that is away from the first slide position, and may, in one embodiment, include when the slide is close to a minimum displacement position, or may be the minimum displacement position. For example, the control slide 12 can be pivotally mounted relative to the control chamber. When the control slide 12 pivots away from the first slide position, the control slide 12 can be considered to be in a second slide position, despite the angle of pivoting.

Specifically, in an embodiment wherein the control slide 12 pivots, a pivot pin 28 or similar feature may be provided to control the pivoting action of the control slide 12. The pivot pin 28 can be mounted to the housing 20. The configuration of the pivotal connection of the control slide 12 in the housing 20 should not be limited.

The pump 10 also has a rotor receiving space 35. The rotor receiving space 35 may have a configuration or shape that compliments the design, configuration, or shape of a drive shaft, such that it connects with the drive shaft that drives the rotor 15 of the pump. This rotor receiving space 35 communicates directly with the inlet and outlet 30, 40 for drawing in oil, lubricant, or another fluid under negative intake pressure through the inlet 30, and expelling the same under positive discharge pressure out the outlet 40.

The rotor 15 is rotatably mounted in the housing 20 within the rotor receiving space 35 of the control slide 12. The rotor 15 is configured for rotation within and relative to the control slide 12. The rotor 15 has a central axis that is typically eccentric to a central axis of the control slide 12. The rotor 15 is connected to a drive input in a conventional manner, such as a drive pulley, drive shaft, engine crank, or gear. As shown in FIG. 2, the receiving space 35 is central to the rotor 15.

The rotor 15 has at least one radially extending vane 18 mounted to the rotor 15 for radial movement and vane ring 19. The at least one vane 18 is configured for engagement with an inside surface of the control slide 12 during rotation thereof. Specifically, each vane 18 is mounted at a proximal end in a radial slot in the central ring of the rotor 15 in a manner that allows them to slide radially. Centrifugal force may force the vane(s) 18 radially outwardly to engage and/or maintain engagement between distal end(s) of the vane(s) and the inside or inner surface 13 of the control slide 12 during rotation thereof. This type of mounting is conventional and well known. Other variations may be used, such as springs or other resilient structures in the slots for biasing the vanes radially outwardly, and this example is not limiting. Thus, the vane(s) 18 can be sealingly engaged with the inner surface 13 of the control slide 12 e.g., by the vane ring 19, such that rotating the rotor 15 draws fluid in through the inlet 30 by negative intake pressure and outputs the fluid out through the outlet 40 by positive discharge pressure. Because of the eccentric relationship between the control slide 12 and the rotor 15, a high pressure volume of the fluid is created on the side where the outlet 40 is located, and a low pressure volume of the fluid is created on the side where the inlet 30 is located (which in the art are referred to as the high pressure and low pressure sides of the pump). Hence, this causes the intake of the fluid through the inlet 30 and the discharge of the fluid through the outlet 40. This functionality of the pump is well known, and need not be detailed further.

The control slide 12 can be moved (e.g., pivoted) to alter the position and motion of rotor 15 and its vane(s) relative to the inner surface 13 of the slide 12, and, thus, alter the displacement of the pump and distribution of lubricant through the outlet 40. Typically, the resilient structure 24 may bias or urge the control slide 12 in or towards its first slide position (or first pivotal direction or position, or a maximum displacement position). A pressure change in the control chamber (the chamber between the outside shape of the slide and the pump housing, between the pivot pin 28 on the left side and the seal at the right side of the slide) can result in the control slide 12 moving or pivoting (e.g., centering) relative to the rotor 15, adjusting (e.g., reducing or increasing) displacement of the pump. The slide 12 may be moved based on the pressure of the lubricant being fed through inlet 30 via inlet port 31 towards outlet 40. In accordance with an embodiment, the min/max positions of the slide 12 in pump 10 are controlled by the PWM valve 42, which controls the pressure in the control chamber behind the slide 12 and, as a consequence, influences the slide position and the pump displacement. The first slide position is the position or direction that increases the eccentricity between the control slide 12 and rotor axes. As the eccentricity increases, the flow rate or displacement of the pump increases. Conversely, as the eccentricity decreases, the flow rate or displacement of the pump also drops. In some embodiments, there may be a position where the eccentricity is zero, meaning the rotor and ring axes are coaxial. In this position, the flow is zero, or very close to zero, because the high and low pressure sides have the same relative volumes. Accordingly, in an embodiment, the first slide position of the control slide 12 is the position or direction for maximum offset or displacement of the pump 100, while the second slide position of the control slide 12 is the position or direction for reduced, limited, or minimal offset or displacement. Again, this functionality of a vane pump is well known, and need not be described in further detail.

In the illustrated embodiment, the resilient structure 24 is a spring, such as a coil spring. In accordance with an embodiment, the resilient structure 24 is a biasing member for biasing and/or returning the control slide 12 to its default or biased position (first or home slide position for minimum eccentricity with the rotor 15). The control slide 12 can be moved against the spring or resilient structure to decrease eccentricity with the rotor 15 based on the pressure within the housing 20 to adjust displacement and hence output flow. The housing 20 may include a receiving portion 37 for the resilient structure 24, partially shown in FIG. 2, for example, defined by portions of the peripheral wall 23, for example, to locate and support the structure (or spring). The receiving portion 37 may include one or more side walls to restrain the structure 24 against lateral deflection or buckling, and a bearing surface against which one end of the spring is engaged. The control slide 12 includes a radially extending bearing structure 60 defining a bearing surface 61 against which the resilient structure 24 is engaged, for example. Other constructions or configurations may be used.

A plurality of seals may be provided between the housing 20/cover and the control slide 12, for example.

As detailed above, pressure is used to control the distribution or delivery of lubricant by the pump 100. The control pressure can be, for example, the pump outlet pressure or the engine gallery feedback pressure. The control pressure may be used to control parts of the pump so that the desired amount of pressurized lubricant is delivered to the system, e.g., engine. Further details regarding control based on pressure are provided later with reference to FIGS. 4-8.

Figure 1:
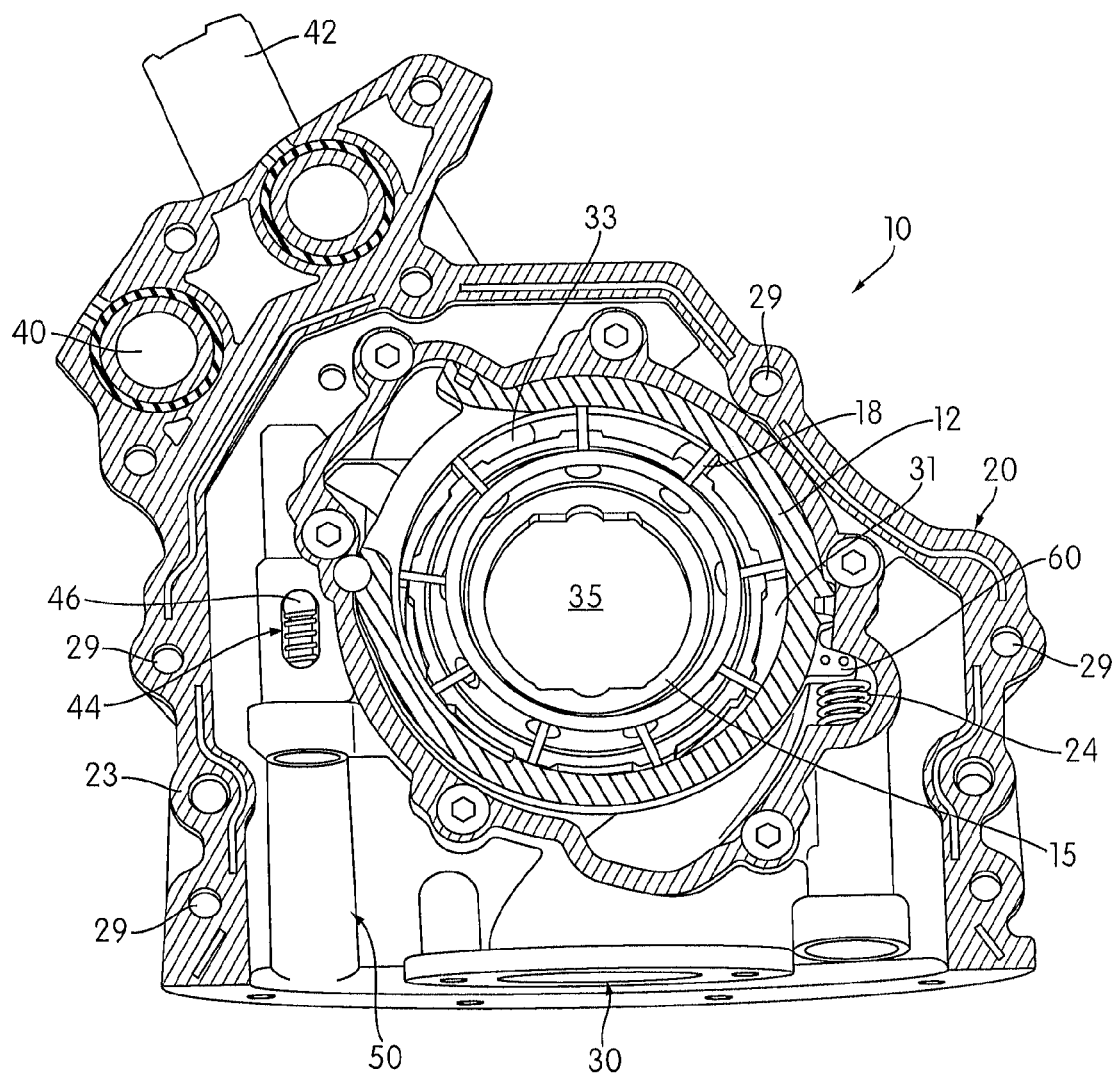
FIG. 1 is a perspective view of part of a pump housing having two pressure chambers and a PWM valve as known in the art.

FIG. 1 is a perspective view of part of a pump housing 10 (without a cover), having two pressure chambers (a higher pressure chamber and a lower or regulated pressure chamber) and a PWM valve 42. The outlet pressure from the outlet port 33 to the outlet 40 acts on the [higher] pressure chamber of the pump as needed, and the PWM valve 42 acts on the regulated pressure chamber. This illustrated pump also has a valve housing 50 therein for a standard panic valve 44 that includes a ball valve 46 with spring (shown in part, via a window). The panic valve 44 is connected at the top to the pump outlet 40 (left side of the pump). The panic valve 44 provides a bypass on the outlet 40 that is designed to reduce and adjust the pressure on the outlet. For example, by opening or moving the ball valve 46 (via the pressure of the lubricant) the bypass can be opened quickly to reduce the pressure and protect the engine and parts around it.

However, in this type of design, the control function of the pump is limited, including when the pressure level on the outlet 40 exceeds a certain amount. That is, there is a pump pressure limitation provided by the outlet channel of outlet 40, that is providing a force to the control slide 12 in the first chamber, between the pivot point 28 and the seal at the top of the control slide 12. It works against the spring and moves the control slide 12 clockwise to a lower displacement position. Thus, because this function is always active, it influences the control function of the PWM valve 42 working on the second control chamber, and may limit the control function of the entire pump 10. This, in turn, could alter the core temperature and pressure (e.g., by 5 or 6 barometer), which risks problems related to damaging the filter or cooler for the lubricant.

Other disadvantages include that such a two chamber design has a very small high pressure chamber, which does not allow for a wide regulation range in PWM mode (in fact, it can provide a reduced regulation range). Also, due to the small high pressure chamber, there tends to be very poor regulation characteristics in fail safe mode. Further, there is high temperature drift in the pump when running in fail safe mode. The spring rate is also critical to define for both chamber functions when using a valve like panic valve 44.

Another prior art design includes a single chamber pump with an integrated fail safe function on a PWM valve (not shown in Figures). This type of integrated fail safe function controls the pump pressure to a fail safe pressure level, which is typically a pressure level slightly higher than the controlled pressure level, in case the PWM valve fails electrically. If the PWM valve fails mechanically, however, this type of known fail safe function may not work any longer.

Generally, a single chamber designed pump is stiffer in its structure and has a better regulation range due to its increased chamber size (e.g., as compared to two smaller chambers). The control of the spring rate can also be designed to regulation requirements. In some cases, the fail safe function is achieved by valve piston inside the PWM valve having 2 diameters (e.g., a bigger diameter and a smaller diameter). However, such a design for the fail safe function adds significant costs to the PWM valve. There also tends to be a temperature drift in fail safe function due to the high spring rate in the valve. Further, the specific fail safe pressure requires an individual valve for each application.

Accordingly, as will become further evident below, the herein disclosed variable vane pump has been designed to include a pressure controlled pilot valve 52 (e.g., controlled by gallery or outlet feedback), along with an electrical proportional pulse width modulation (PWM) valve 42, to have a closed loop controlled pump that controls gallery pressure by the engine ECU depending on engine speed, engine load, and temperature. The disclosed pump with this combination of valves satisfies at least the customer requirement or expectation that the pump is operational for a minimum amount of distance (e.g., ~30 000 km) or time under a fail safe function with controlled oil/lubricant pressure when there is electrical or mechanical failure in the PWM valve. This disclosure also provides a pump that may regulate over temperature and speed without exceeding a predetermined or threshold pressure (e.g., ~8 bar), which is typically not realized by prior art systems that only use a pressure relief valve (e.g., due to possible pump damage, running in 100% displacement) in fail safe conditions.

The pump shown in FIG. 2 has a single control chamber between the housing 20 and the control slide 12 for receiving pressurized lubricant to move the control slide 12 towards the second position. A PWM valve 42 is also shown as part of pump and controls the pressure of the pump, depending on the engine conditions, e.g., engine speed, temperature, engine load, etc.

In addition, the pump of FIG. 2 has a pressure controlled pilot valve 52 (see FIG. 3) provided in a valve housing 50. The disclosed pilot valve 52 can replace the prior-art panic valve. In an embodiment, the disclosed pilot valve 52 fits in the same space or valve housing 50.

Figure 3:
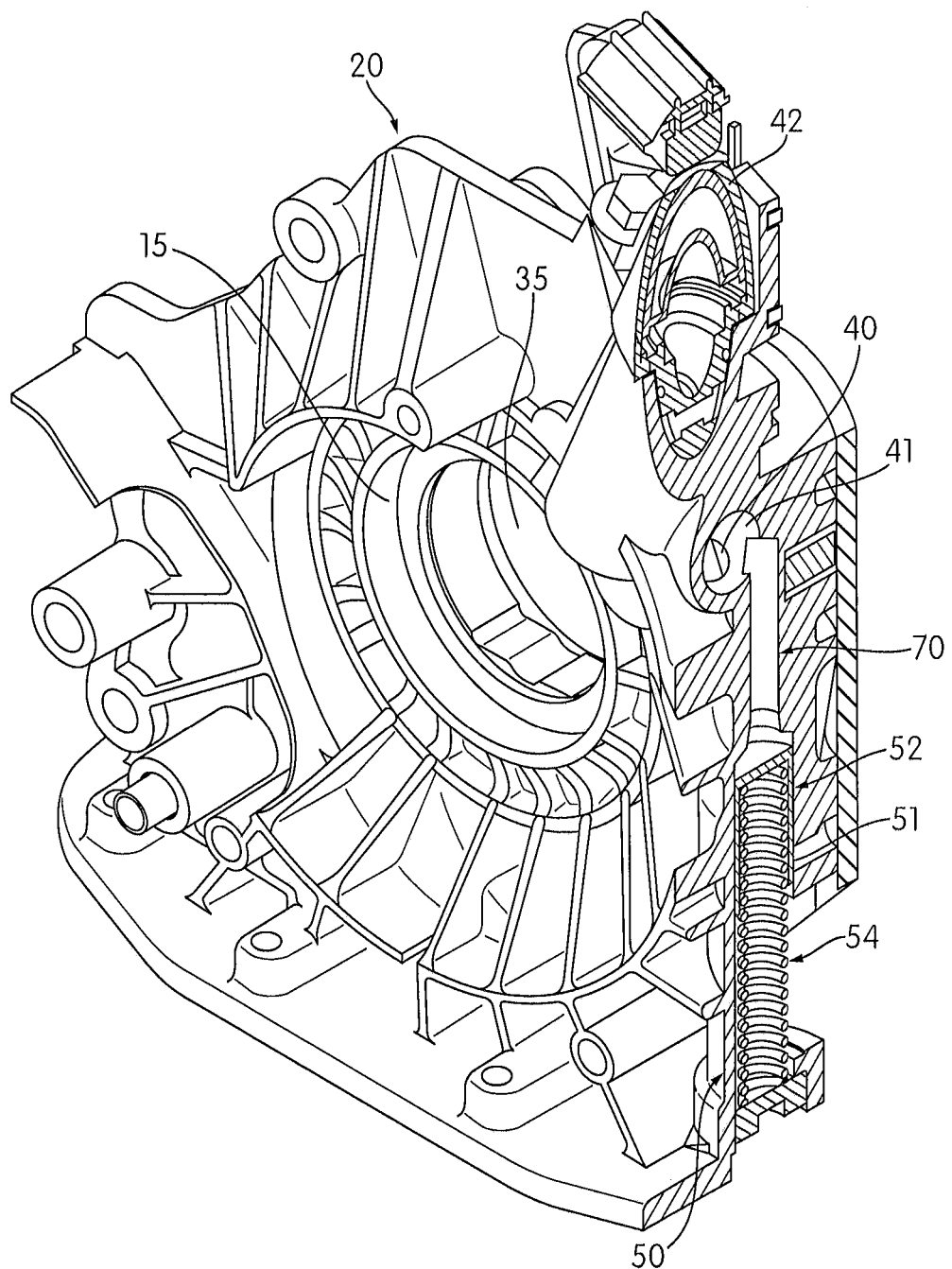
FIG. 3 is a topside perspective and sectional view of the pump housing of FIG. 2.

The pressure controlled pilot valve 52 is moveable between a first valve position and at least a second valve position within valve housing 50 based on an output pressure of the pressurized lubricant delivered through the outlet 40. The pressure controlled pilot valve 52 has a direct connection to the pump outlet 40 via connection channel 41, as shown in FIG. 3, for example. The pressure controlled pilot valve 52 is inactive in the first valve position for the output pressure below a threshold level and is active near or in the second valve position for the outlet pressure that is at or above the threshold level. The pilot valve 52 may be activated to move towards or into the second valve position and place the pump 10 in a fail safe mode to control the maximum pump pressure in case of PWM valve 42 failure. When the PWM valve 42 fails, the pilot valve 52 may take over and may be used to balance pressure forces of oil/lubricant pressure through channels in the pump housing, e.g., by limiting the pump pressure, e.g., over a speed range.

As will become evident by the description below, the fail safe function of this pump combines the previously described panic valve functions along with additional functions.

Figure 9:
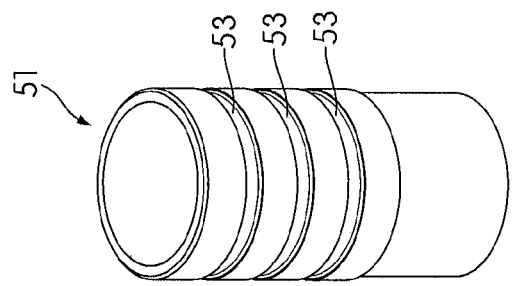
FIG. 9 shows a perspective view of a pressure controlled pilot valve with stepped configuration used in the pump housing in accordance with an embodiment of this disclosure.

The pressure controlled pilot valve 52 includes a valve body 51 (see FIG. 9) and a spring 54 as provided in the valve housing 50. As shown in FIG. 3, for example, the spring 54 biases the valve body 51 in an upward direction towards the outlet connection 41 connected to the outlet 40 of the pump. The position of the valve body 51 is configured to alter the movement of lubricant through the pump housing 20 and through the outlet 40. In an embodiment, as shown in FIG. 9, for example, the valve body 51 includes a number of indentations 53 or grooves therein that, based on the position of the valve body 51 within the valve housing 50, may receive lubricant therein. Should pressurized lubricant come through one or more of the herein described channels (e.g., channels 74-78) of the pump, the indentations 53 may aid in balancing pressure forces of oil pressure through channels in the pump housing.

Moreover, as noted above, the pump of FIG. 2 includes a number of channels therein to aid in controlling the fail safe function (via the pressure controlled pilot valve 52) of the pump.

Figure 5:
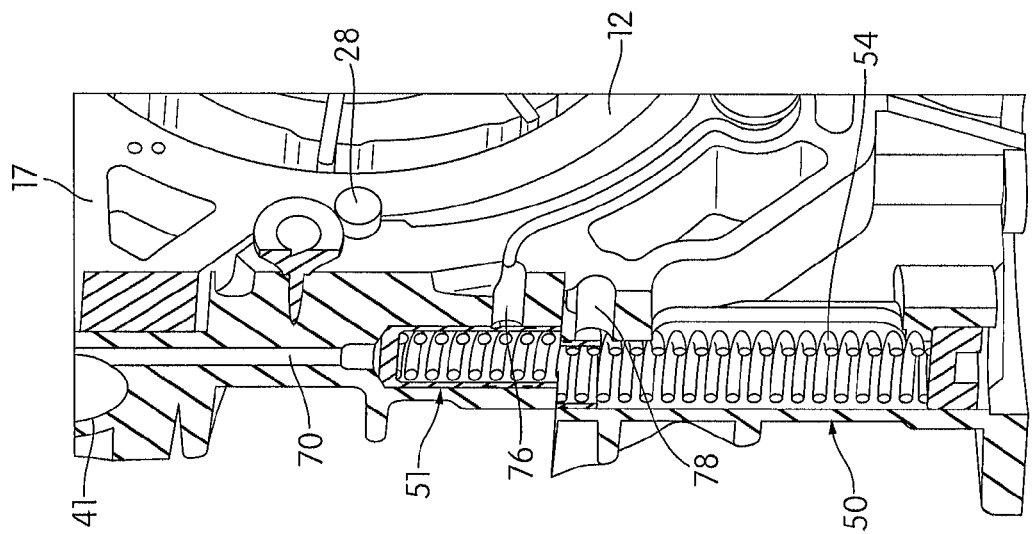
Figure 4:
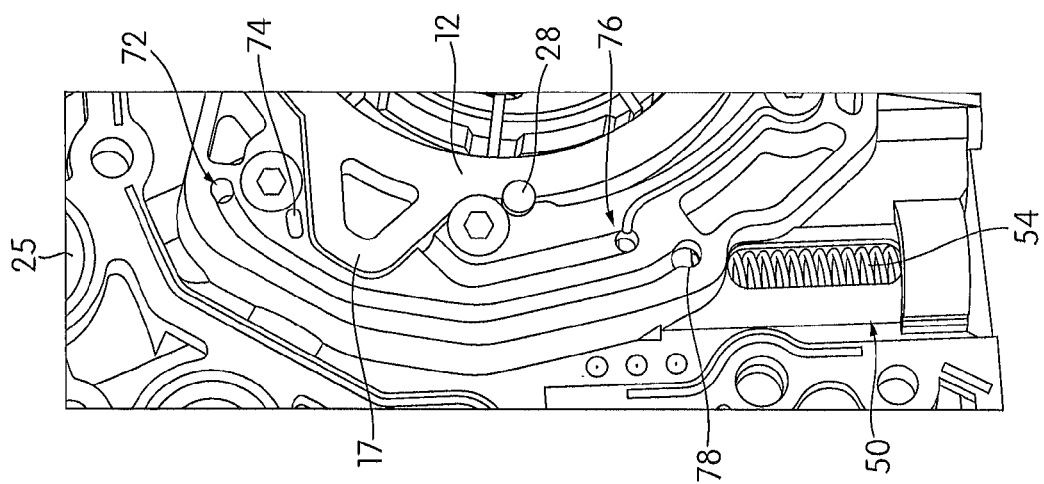
FIG. 4 is a detailed underside view of the pressure controlled pilot valve and channels in the pump housing, in accordance with an embodiment.

As seen in FIGS. 4 and 5, for example, a second channel 76 and a fourth channel 78 are provided in the pump and each connect the pressure controlled pilot valve 52 and the control chamber. A first channel 74 connects the PWM valve 42 to the control chamber of the pump 10. The second channel 76 is configured for selective fluid communication with the control chamber. During regular functioning and use of the pump 10, for example, the first channel 74 is used for communication of lubricant between the control chamber and PWM valve 42. Communication of lubricant to the control chamber via the second channel 76 may be allowed during fail safe conditions, for example (e.g., based on pressure forces from the lubricant). A third channel 72 and the fourth channel 78 connect the PWM valve 42 and the lubricant sump. The fourth channel 78 is configured for selective fluid communication with the lubricant sump, based on the position of the pressure controlled pilot valve 52. A fifth channel 70 (as seen in FIG. 3 and FIG. 5) connects the pressure controlled pilot valve 52 and the outlet 40.

In an embodiment, second channel 76 and third channel 72 are newly added to pump housing. That is, the second and third channels 76, 72 may be added to (e.g., machined in) an existing pump housing.

In operation, the pressure controlled pilot valve 52 is configured for selective movement into and between its first and at least second positions based on the pressure level through the outlet 40 and connection 41, based on if the PWM valve 42 is properly operating. In fail safe mode, when the PWM valve fails to control the pump 10, the pressure controlled pilot valve 52 is moved from its first (inactive) position towards and/or into its second (active) position. For example, the pressure controlled pilot valve 52 is configured for selective movement to the second valve position via fluid communication through the fifth channel 70 when the outlet pressure is at or above the threshold level.

The PWM valve 42 is connected to the feedback from the gallery or outlet 40. Generally, the PWM valve 42 is used to control the pump under all normal or lower pressure conditions. However, when the outlet pressure exceeds a predetermined or threshold amount and/or if a controller associated with the pump fails, the pressure controlled pilot valve 52 takes over. Accordingly, the pressure controlled pilot valve 52 as disclosed herein controls the pressure in the control chamber via firstly overruling the (failed) PWM valve 42 and secondly supplying pressure into the control chamber and reduces the pressure within the housing 20. It indirectly controls the pressure in the pump via its connections with (or closing off of) the fourth channel 78 to the PWM valve 42 and thus from the PWM valve 42 to the sump. By (at least partially) closing the connection of the PWM valve 42 to the sump in the second pilot valve position, (i.e., fourth channel 78 is closed via movement of the pilot valve 52), a significant loss of pressure from the control chamber to the oil sump—due to the failed PWM valve 42—is prevented. As the pressure of the lubricant through the outlet 40 exceeds a predetermined or threshold amount, only the pressure controlled pilot valve 52 is activated, thus overruling the PWM valve 42 to take control of the pump and alter and secure the pressure such that it does not exceed the predetermined or threshold level. Accordingly, the pressure controlled pilot valve 52 acts in a panic mode function, and only when required. The PWM valve 42 is otherwise used to control the pump under stable or normal conditions.

Figure 6:
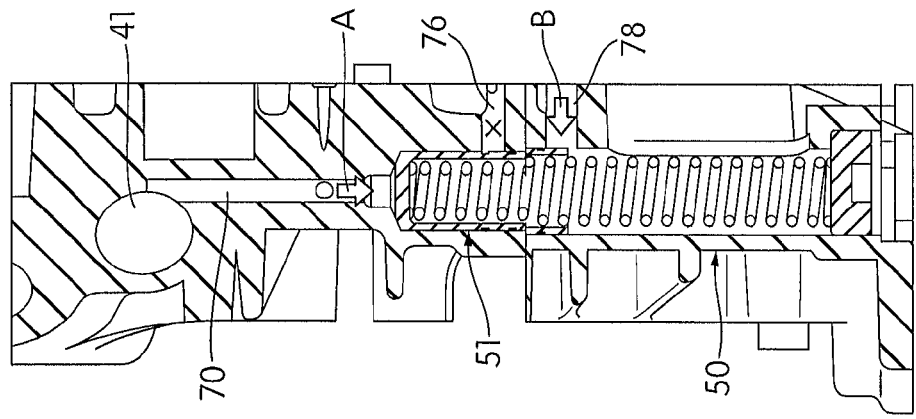
FIGS. 5 and 6 show detailed underside and sectional views of the pressure controlled pilot valve in a first valve position in the pump housing, in accordance with an embodiment.

In operation, when the fail safe function of the pump is off and the pressure controlled pilot valve 52 is in its first valve position, as shown in FIG. 5 and FIG. 6, the pressure controlled pilot valve 52 is biased to its first valve position, or a closed, inactive, or default position. The spring 54 pushes the valve body 51 in an upward direction, thus disabling the pilot fail safe function. Fluid communication is allowed through the first channel 74 via the PWM valve 42, along with venting to the lubricant sump via the third channel 72 and to the lubricant sump via the fourth channel 78 (as indicated by arrow B), while fluid communication is closed through the second channel 76, in the first (inactive) position, i.e., during regular operation of the pump. That is, the valve 52 closes the feed from the outlet 40 to the control chamber, and instead the control chamber is vented through the third channel 72. Further, the valve 52 opens the fourth channel 78 to feed lubricant to the sump. The PWM valve 42 controls the pressure in the pump (thus operating the pump in a PWM regulation mode).

Figure 8:
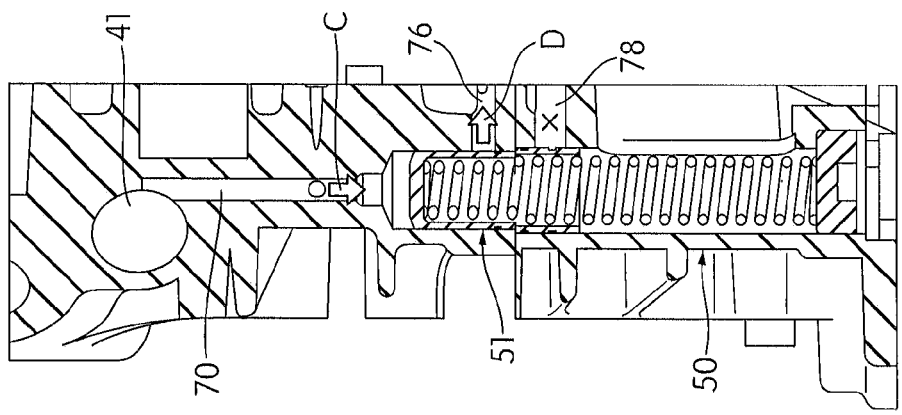
FIGS. 7 and 8 show detailed underside and sectional views of the pressure controlled pilot valve in a second valve position in the pump housing, in accordance with an embodiment.
Figure 7:
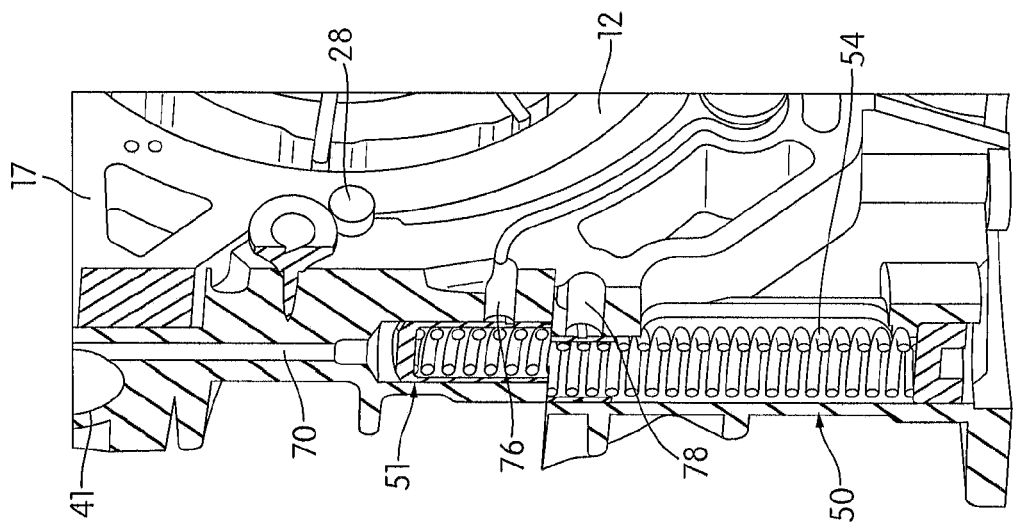

Once the outlet pressure of the lubricant exceeds a predetermined or threshold amount, and the PWM valve 42 fails, the outlet pressure may act on the pressure controlled pilot valve 52 and moves it towards and/or to its second valve position. The pressure controlled pilot valve 52 is configured to control pressure in the control chamber via fluid communication through the second channel 76, depending on the PWM valve 42 failed position. The predetermined or threshold amount of pressure for activating the pilot valve 52 may be based on a customer's specifications, for example. In an embodiment, the pilot valve opening pressure (i.e., the pressure for activating the pressure controlled pilot valve 52 and moving it to its second position to act as a fail safe) is approximately 7 bar. For example, when the pressure through the fifth channel 70 directed to the valve body 51, as indicated by arrow A in FIG. 6, is less than 7 bar (or any predetermined or threshold amount), the valve 52 remains in its first valve position as shown in FIGS. 7-8. However, when the pressure is at or exceeds ~7 bar (or the predetermined, threshold, or selected amount), the valve 52 may be moved to its second valve position. The outlet pressure acts on the valve body 51 and against the spring 54 and pushes the pilot valve (i.e., the valve body 51) down relative to the valve housing 50 (as shown by arrow C in FIG. 8) so that the lubricant flows through the fifth channel 70.

In (or near) its second valve position, i.e., during higher outlet pressure incidents where a panic or fail safe function is implemented, or a fail safe regulation mode, as shown in FIG. 7 and FIG. 8, the pressure controlled pilot valve 52 may be moved via pressure from the lubricant in the housing. Further, in fail safe regulation mode, the PWM function of the PWM valve 42 may be disabled from controlling the pressure in the control chamber and closed. The pressure controlled pilot valve 52 may then take over and be opened to its second position to vent the pressure from the control chamber. Specifically, the pressure controlled pilot valve 52 may be configured to take over and control pressure in the control chamber via moving to its active position and allowing fluid communication through the second channel 76 from the fifth channel 70, and close fluid communication through the fourth channel 78, thereby pressurizing the control chamber via flow from the outlet 40 to the control chamber. That is, the valve 52 opens the feed from the outlet 40 to the control chamber by allowing flow through the second channel 76, as indicated by arrow C and arrow D in FIG. 8. The lubricant received through the second channel 76 pressurizes and acts on the slide in the control chamber to regulate the pump. Further, to achieve acceptable pump regulation, the connection of the outlet channel 41 and the second channel 76 is throttled by a reduced diameter with indentations 53 of the upper part of the valve body to regulate the flow into the control chamber. The control chamber is vented through the first channel 74 back to the PWM valve 42 (which is open and not energized or controlling the pump). The pilot valve closes the connection of the vent of the PWM valve 42 (via third channel 72 and fourth channel 78) to allow the pump outlet pressure to build up in the control chamber to regulate the pump.

Accordingly, the pressure controlled pilot valve 52 as disclosed herein is a proportionally controlled valve that controls the pressure in the control chamber without use of the PWM valve 42 (e.g., such as when the PWM valve 42 fails). It indirectly controls the pressure in the pump via its controlled connections with the channels (e.g., channels 72, 74, 76, 78) to the outlet and/or to the sump to secure a maximum pressure level that is not higher than a predetermined or threshold amount. That is, the pilot valve 52 may move to a second position, opening up the pressure channel (s) to move the control slide 12 and control the pump outlet pressure. The valve may do so by, for example, moving to find a position, e.g., its second position, that opens up the channel(s) at least partially (e.g., via only on a small cross section—a fully open channel or channels is not necessary) so that it may find a balance between the outlet pressure and the control pressure (control pressure for the slide is significantly lower than the outlet pressure), or by moving relatively up and down (back and forth into and/or between its first and second positions) to balance the outlet pressure. The positions of the pilot valve 52 result in different feeds of the control chamber to control the pump pressure. As the pressure of the lubricant through the outlet 40 exceeds a predetermined or threshold amount, only the pressure controlled pilot valve 52 is activated, thus overruling the PWM valve 42 to take control of the pump and alter and secure the pressure such that it does not exceed the predetermined or threshold level. Accordingly, the pressure controlled pilot valve 52 acts in a panic mode function, i.e., only when required, to protect the engine from too high pressure, or blowup. The pilot valve 52 keeps the pressure level low in the pump 10 in case of PWM failure (compared to a standard panic valve function) and results in lower drive torque and lower power consumption of the pump, thus also keeping fuel consumption at low level for these conditions. The PWM valve 42 is otherwise used to control the pump under stable or normal conditions.

In accordance with an embodiment, the pressure controlled pilot valve 52 is optionally moveable between more than two positions, e.g., into and/or between a first valve position, a second valve position, and at least a third valve position, within valve housing 50, based on an output pressure of the pressurized lubricant delivered through the outlet 40. The pressure controlled pilot valve 52 may be inactive in the first valve position for the output pressure below a threshold level and is active near or in the second valve position and/or near or in a third valve position for an outlet pressure that is at or above a threshold level, for example. The pilot valve 52 may be activated to move towards or into the second valve position and/or third valve position and place the pump 10 in a fail safe mode to control the maximum pump pressure in case of PWM valve 42 failure. When the PWM valve 42 fails, the pilot valve 52 may take over and may be used to balance pressure forces of oil/lubricant pressure through channels in the pump housing, e.g., by limiting the pump pressure, e.g., over a speed range, in any number of positions. The pilot valve 52 may move further within the valve housing 50 (e.g., further down, with reference to the FIGS.) into its third position, and, optionally, further open up channel(s) within the housing and/or open up an additional and/or separate cross section of a channel or port (not shown) that is connected to the tank or sump, for example, so that the outlet pressure is (further) reduced.

Further, the disclosed pressure controlled pilot valve 52 may act as a panic valve during cold start conditions when the pump control via the PWM valve 42 is not quick enough to control the outlet pressure (e.g., below a defined maximum pressure target or threshold, e.g., such as 7 or 10 bar). For example, the pilot valve 52 may be moved to another (e.g., second) position where the outlet is vented through the fifth channel 70 directly to the lubricant sump, or to a position (e.g., third) position to vent through another channel or port (not shown) to the sump, and reduce the outlet pressure, until such venting is no longer needed for regular operation of the pump 10. Movement into a third position allows for control of pump and pressure when the pressure control in fail safe mode in a second position is not fast enough.

The pressure controlled pilot valve 52 as disclosed herein may be implemented and applied to PWM valve controlled pumps, for example, and should not be limited to the disclosed exemplary design. Such pumps are typically single chamber pumps, but the use of the pilot valve 52 is not limited to such types.

Figure 10:
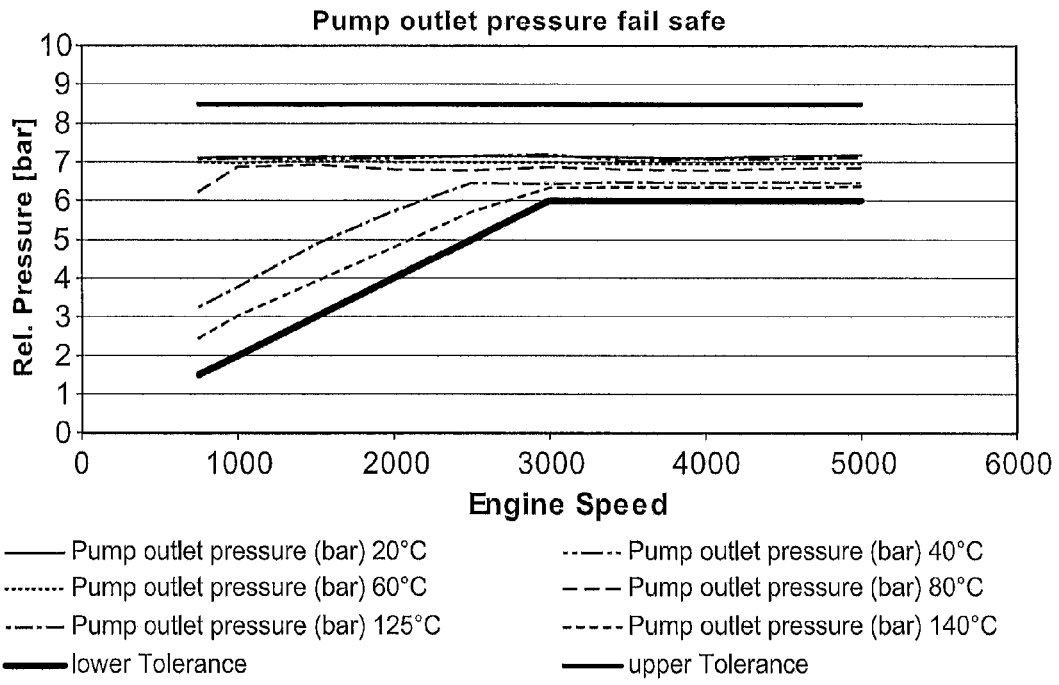
FIG. 10 is an exemplary plot of the pump outlet pressure when the fail safe function of the pressure controlled pilot valve is implemented, as shown by measuring the relative pressure versus engine speed.
Figure 11:
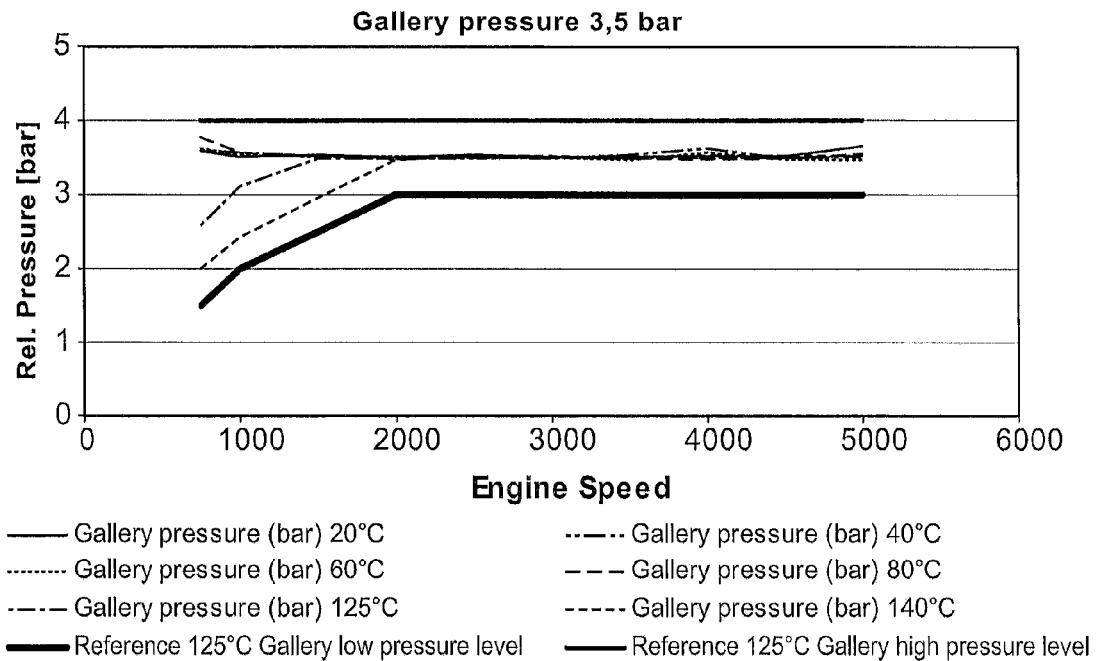
FIG. 11 is an exemplary plot of the gallery pressure when the fail safe function of the pressure controlled pilot valve is implemented, as shown by measuring the relative pressure versus engine speed.

FIG. 10 is an exemplary plot of the pump outlet pressure when the fail safe function of the disclosed pressure controlled pilot valve is implemented, as shown by measuring the relative pressure versus engine speed. As seen in the plot of FIG. 10, at lower engine speeds, e.g., less than 3000 rpm, the pump outlet pressure is increases. However, when the fail safe mode is in effect and the pressure controlled pilot valve 52 is moved towards and/or in its second valve position in the pump 100, the relative pressure is maintained at a relatively steady pressure even as the engine speed increases to greater than 3000 rpm, between a lower tolerance and an upper tolerance. FIG. 11 is an exemplary plot of the gallery pressure when the fail safe function of the disclosed pressure controlled pilot valve is disabled and the PWM regulation mode is implemented, as shown by measuring the relative pressure versus engine speed. As seen in the plot of FIG. 11, the pump gallery pressure is relatively maintained between a lower tolerance and an upper tolerance despite the engine speed.

Accordingly, it has been shown then that use of a standard proportional valve in the form of pilot valve 52 in variable vane pumps is possible, while providing a more robust regulation behavior as compared to PWM valves. The fail safe mode as disclosed herein covers all failure of the PWM valve—including any mechanical sticking of the valve or electrical failure—which would not be covered by a valve integrated SLR function as known in prior art.

The herein disclosed valve system can be used at different pump applications as well.

Figure 12:
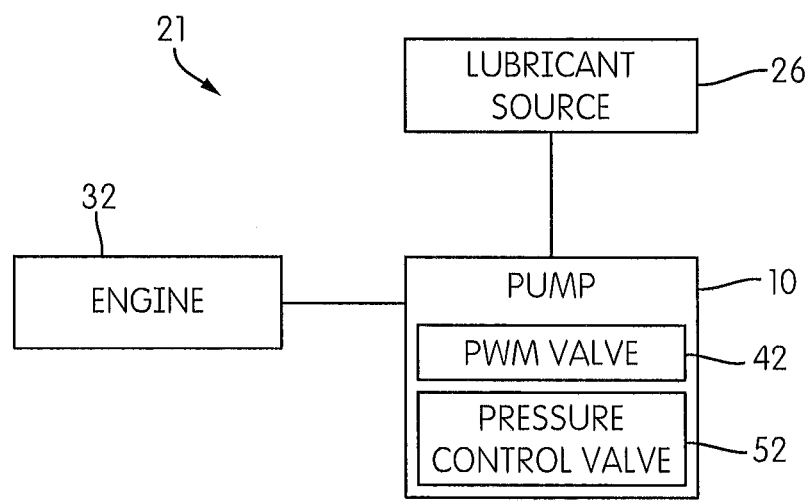
FIG. 12 is a schematic diagram of a system in accordance with an embodiment of the present disclosure.

Another aspect of this disclosure provides a system that includes: an engine; a lubricant source containing lubricant and a variable displacement vane pump connected to the lubricant source for dispensing lubricant to the engine. FIG. 12 is a schematic diagram of a system 21 in accordance with an embodiment of the present disclosure. The system 21 can be a vehicle or part of a vehicle, for example. The system 21 includes a mechanical system such as an engine 32 (e.g., internal combustion engine) for receiving pressurized lubricant from the pump 100. The pump 100 receives lubricant (e.g., oil) from a lubricant source 26 (input via inlet 30) and pressurizes and delivers it to the engine 32 (output via outlet 40). As described previously with reference to FIGS. 2-8, the pump 100 includes a PWM valve 42 and a pressure controlled pilot valve 52 that work in an alternating fashion. More specifically, the pump 100 includes: a housing, an inlet for inputting lubricant from a source into the housing, an outlet for delivering pressurized lubricant to the system from the housing; and a lubricant sump for holding lubricant. The pump also includes a control slide displaceable within the housing between a first slide position and a second slide position to adjust displacement of the pump through the outlet, a resilient structure biasing the control slide towards the first slide position, a rotor with at least one vane mounted in the housing and configured for rotation within and relative to the control slide, the at least one vane configured for engagement with an inside surface of the control slide during rotation thereof, and a control chamber between the housing and the control slide for receiving pressurized lubricant to move the control slide towards the second position. The pump also has an electrical valve fluidly connected to the control chamber to control pressure therein. A first channel connects the control chamber and the electrical valve. Further, the pump has a pressure controlled valve moveable between a first valve position and a second valve position based on an output pressure of the pressurized lubricant delivered through the outlet. The pressure controlled valve is in the first valve position for the output pressure below a threshold level and in the second valve position for the outlet pressure that is at or above the threshold level. A second channel connects the pressure controlled valve and the control chamber, and a third channel vents the electrical valve. A fourth channel is connected to the third channel and the pressure controlled valve and configured for selective communication with the lubricant sump. A fifth channel connects the pressure controlled valve and the outlet. In its first valve position, the pressure controlled pilot valve is inactive and (a) closes fluid communication through the second channel to the control chamber, and (b) opens the fourth channel for communication to the lubricant sump thereby allowing the electrical valve to pressurize the control chamber by delivering fluid in through the first channel and vent the control chamber via the third and fourth channels. In its second valve position, the pressure controlled pilot valve is active and (a) controls pressure in the control chamber via fluid communication from the outlet, through the fifth channel and through the second channel to the control chamber, and (b) closes fluid communication through the fourth channel to the lubricant sump, thereby pressurizing the control chamber via flow from the outlet to the control chamber. The pressure controlled valve is configured for selective movement to the second valve position via fluid communication through the fifth channel when the outlet pressure is at or above the threshold level and the electrical valve is disabled.

Although not shown, additional seals can be provided in the housing 20 and/or cover, such as seals 25 in the form of rings for connection to another part of the pump. Any number of additional seals could be used.

Also, the depictions of the parts of the pump 10 as shown in FIGS. 2 and 3, for example, are not intended to be limiting. For example, the control ring or control slide 12 as shown in FIG. 2 includes a D-ring portion 17 that provides an additional outlet connection 43 to outlet 40 for lubricant to flow through (from the internal chamber). However, use of such a D-ring portion 17 is not intended be limiting, and may not be provided at all. Further, an additional outlet connection 43 or opening need not be provided in the pump 10.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A variable displacement vane pump for dispensing lubricant to a system, the pump being configured for connection to a lubricant sump for holding lubricant, the pump comprising:
   a housing;
   an inlet for inputting lubricant from a source into the housing;
   an outlet for delivering pressurized lubricant to the system from the housing;
   a control slide displaceable within the housing between a first slide position and a second slide position to adjust displacement of the pump through the outlet;
   a resilient structure biasing the control slide towards the first slide position;
   a rotor with at least one vane mounted in the housing and configured for rotation within and relative to the control slide, the at least one vane configured for engagement with an inside surface of the control slide during rotation thereof;
   a control chamber between the housing and the control slide for receiving pressurized lubricant to move the control slide towards the second position;
   an electrical valve fluidly connected to the control chamber to control pressure therein;
   a first channel connecting the control chamber and the electrical valve;
   a pressure controlled valve moveable between a first valve position and a second valve position based on an output pressure of the pressurized lubricant delivered through the outlet, the pressure controlled valve being in the first valve position for the output pressure below a threshold level and in the second valve position for the outlet pressure that is at or above the threshold level;
   a second channel connecting the pressure controlled valve and the control chamber;
   a third channel for venting the electrical valve;
   a fourth channel connected to the third channel and pressure controlled valve and configured for selective communication with the lubricant sump;
   a fifth channel connecting the pressure controlled valve and the outlet;
   wherein, in its first valve position, the pressure controlled valve is inactive and (a) closes fluid communication through the second channel to the control chamber, and (b) opens the fourth channel for communication to the lubricant sump thereby allowing the electrical valve to pressurize the control chamber by delivering fluid in through the first channel and vent the control chamber via the third and fourth channels;

wherein, in its second valve position, the pressure controlled valve is active and (a) controls pressure in the control chamber via fluid communication from the outlet, through the fifth channel and through the second channel to the control chamber, and (b) closes fluid communication through the fourth channel to the lubricant sump, thereby pressurizing the control chamber via flow from the outlet to the control chamber; and wherein the pressure controlled valve is configured for selective movement to the second valve position via fluid communication through the fifth channel when the outlet pressure is at or above the threshold level and the electrical valve is disabled.

2. The pump according to claim 1, wherein the electrical valve is a pulse width modulation valve, wherein the pulse with modulation valve controls the pressure in the control chamber when the pressure controlled valve is in its first valve position.

3. The pump according to claim 2, wherein the pulse width modulation valve is disabled from controlling the pressure in the control chamber when the pressure controlled pilot valve in its second valve position.

4. The pump according to claim 1, wherein the pressure controlled valve comprises a reduced diameter adjacent to the second channel to regulate flow from the fifth channel into the control chamber in the second valve position.

5. The pump according to claim 1, wherein the system is an engine.

6. The pump according to claim 1, wherein the pressure controlled valve is further moveable to a third valve position based on the output pressure of the pressurized lubricant delivered through the outlet, the pressure controlled valve being in the third valve position for the outlet pressure that is above the threshold level.

7. A system comprising:
an engine;
a lubricant source containing lubricant;
a variable displacement vane pump connected to the lubricant source for dispensing lubricant to the engine, the pump connected to a lubricant sump for holding lubricant, the pump comprising:
  a housing;
  an inlet for inputting lubricant from the lubricant source into the housing;
  an outlet for delivering pressurized lubricant to the system from the housing;
  a control slide displaceable within the housing between a first slide position and a second slide position to adjust displacement of the pump through the outlet;
  a resilient structure biasing the control slide towards the first slide position;
  a rotor with at least one vane mounted in the housing and configured for rotation within and relative to the control slide, the at least one vane configured for engagement with an inside surface of the control slide during rotation thereof;
  a control chamber between the housing and the control slide for receiving pressurized lubricant to move the control slide towards the second position;
  an electrical valve fluidly connected to the control chamber to control pressure therein;
  a first channel connecting the control chamber and the electrical valve;
  a pressure controlled valve moveable between a first valve position and a second valve position based on an output pressure of the pressurized lubricant delivered through the outlet, the pressure controlled valve being in the first valve position for the output pressure below a threshold level and in the second valve position for the outlet pressure that is at or above the threshold level;
  a second channel connecting the pressure controlled valve and the control chamber;
  a third channel for venting the electrical valve;
  a fourth channel connected to the third channel and the pressure controlled valve and configured for selective communication with the lubricant sump;
  a fifth channel connecting the pressure controlled valve and the outlet;
  wherein, in its first valve position, the pressure controlled valve is inactive and (a) closes fluid communication through the second channel to the control chamber, and (b) opens the fourth channel for communication to the lubricant sump thereby allowing the electrical valve to pressurize the control chamber by delivering fluid in through the first channel and vent the control chamber via the third and fourth channels;
  wherein, in its second valve position, the pressure controlled valve is active and (a) controls pressure in the control chamber via fluid communication from the outlet, through the fifth channel and through the second channel to the control chamber, and (b) closes fluid communication through the fourth channel to the lubricant sump, thereby pressurizing the control chamber via flow from the outlet to the control chamber; and
  wherein the pressure controlled valve is configured for selective movement to the second valve position via fluid communication through the fifth channel when the outlet pressure is at or above the threshold level and the electrical valve is disabled.

8. The system according to claim 7, wherein the electrical valve is a pulse width modulation valve, wherein the pulse with modulation valve controls the pressure in the control chamber when the pressure controlled valve is in its first valve position.

9. The system according to claim 7, wherein the pressure controlled valve comprises a reduced diameter adjacent to the second channel to regulate flow from the fifth channel into the control chamber in the second valve position.

10. The system according to claim 8, wherein the pulse with modulation valve is disabled from controlling the pressure in the control chamber when the pressure controlled valve is in its second valve position.

11. The system according to claim 7, wherein the pressure controlled valve is further moveable to a third valve position based on the output pressure of the pressurized lubricant delivered through the outlet, the pressure controlled valve being in the third valve position for the outlet pressure that is above the threshold level.

* * * * *